Patented Mar. 26, 1935

UNITED STATES PATENT OFFICE 1,995,847

METHOD OF IMPROVING THE PROPERTIES OF RUBBER AND PRODUCT

Willis A. Gibbons, Montclair, N. J., assignor, by mesne assignments, to United States Rubber Company, New York, N. Y., a corporation of New Jersey No Drawing. Application March 8, 1930, Serial No. 434,462

9 Claims. (Cl. 18—50)

This invention relates to a method of improving the physical properties of rubber and to the product, more particularly to the improvement of the properties of alkaline rubbers, both in their unvulcanized and vulcanized condition.

In the preparation and manipulation of raw and reclaimed rubber for the manufacture of rubber or rubber and fabric articles, certain physical properties are desired, such as ease of breakdown of the rubber on the mill, smooth calendering, and plasticity. In vulcanized articles, particularly those composed of rubber and fibrous material which are subjected to a flexing action in use, such as tires, belting and hose, it is desired to obtain the greatest resistance to separation between the rubber and fibre caused by the flexing action.

This application is a continuation in part of my co-pending application Serial No. 153,736, filed December 9, 1926.

It has been found that raw rubbers which are decidedly alkaline, such as those to which alkaline materials have been directly added, and reclaimed rubbers which have been reclaimed by the alkali process, are deficient in some or all of the properties of easy breakdown, smooth calendering and extruding, and when such rubbers are incorporated in rubber and fabric articles, the articles are deficient in resistance to flexing. The present invention therefore relates to a method for improving the physical properties of such alkaline rubber or alkaline reclaim during its manipulation prior to vulcanization and to improving the flexing ability of the vulcanized material when included in a rubber and fibre article. The invention is not limited however in its application to such rubbers, but also decidedly improves the breakdown, calendering and extruding ability, and flexing ability of other rubbers such as all-solids-content-latex evaporated rubbers, coagulated rubbers, and in general those which show an alkaline ash, and it is also applicable to combinations of any of the above rubbers.

An object of the present invention is to provide a process for obtaining a vulcanized rubber of improved flexing characteristics. Another object is to provide a process for softening, and in general improving the breakdown, calendering and extruding properties of, rubbers during manufacturing operations. The invention also resides in the product of the method.

The invention consists broadly in incorporating in solid rubber having an alkaline ash a material, hydrolyzable to produce acid ions capable of decomposing alkali proteinates and soaps, in quantity sufficient to impart to the water extract of the rubber a pH of 7 or less, working to a smooth, plastic condition, and, if desired, vulcanizing; and it also consists in the products obtained.

While as previously stated the invention is applicable to raw rubber to which a fixed alkali has been directly added or to an alkali treated reclaim, it is also of value in the treatment of any rubbers which show an alkaline ash, such as coagulated rubbers, all-solids-content-latex evaporated rubbers, or mixtures of any of these. In carrying out the invention there are incorporated with solid rubbers or mixtures of rubbers as above named, materials which are hydrolyzable to produce acid ions capable of decomposing alkali proteinates and soaps, in quantity sufficient to impart to the water extract of the rubber a pH of 7 or less; and this may be accomplished (I) by incorporating with the rubber suitable amounts of non-volatile organic or inorganic acids strong enough to decompose alkali proteinates or alkali soaps, (II) volatile base salts of such acids, or (III) heavy metal water soluble salts of acids, organic or inorganic, volatile or non-volatile, which are strong enough to decompose alkali proteinates or alkali soaps. These acids or salts may be added either as such or in solution, and they may be added on the ordinary form of roll mill or in a closed mixer.

To illustrate the improvement in handling properties of the raw rubber accomplished by the invention, 100 parts by weight of raw rubber containing 1 part by weight of potassium hydroxide is placed on a mixing mill and allowed to run thereon until it shows some tendency to stick together. This rubber is in no sense broken down, as the term is understood in the rubber industry, but retains a rough texture, as evidenced by the lumpy surface. Continued mixing does not result in the smooth sheet which is characteristic of the market grades of pale crepe or fine para. In fact it resembles a rubber stock which has become prevulcanized on the mixing mill, that is, a stock which contains an accelerator so powerful that vulcanization starts before the batch is removed from the mill. The distribution of 1¼ parts by weight of phosphoric acid in the above alkaline rubber on the mixing mill is accompanied by a marked change in the outward appearance of the rubber. After the acid has become uniformly distributed throughout the batch, the latter loses its rough surface, takes on the outward appearance of well plasticized fine para, and shows an improvement in behavior in manufacturing operations requiring considerable plasticity, and the vulcanized product has increased flexing capacity.

In the case of pale crepe, smoked sheet and the other softer commercial rubbers, which are known to break down to a smooth state, the inclusion of the acidic material does not give as striking a contrast on the mixing mill as in instances where the rubber contains non-volatile alkali. With rubbers prepared by evaporation the length of time required to obtain a smooth sheet on the mixing mill is somewhat longer than that required for crepe or sheet, and the inclusion of an acid material in one of these evaporated rubbers cannot always be accomplished rapidly enough for a considerable reduction of the milling period to be observed. With rubber containing an appreciable amount of fixed alkali as such, the effect of the acid treatment is clearly observable on the mixing mill, for the rubber becomes smooth in very little more than the length of time required for crepe or sheet. Without the acid treatment it is practically impossible to obtain a smooth sheet of such alkaline rubber. The amount of acidic material added may be calculated as that required to neutralize the amount of alkali in the rubber, or to impart the desired reduced alkalinity or slight acidity. Preferably the acidic materials are those which have a hydrogen ion concentration somewhat on the acid side of $1 \times 10^{-7}$, that is pH 7. In the example given above where rubber containing 1% of potassium hydroxide is treated with 1¼% of phosphoric acid, the pH of the water extract of the rubber after treatment is 6.5, indicating that the rubber is no longer alkaline but faintly acid.

As illustrating the improvement in softness and other handling characteristics, when the process of the invention is applied to a reclaim, the following example is given:

To 600 gram samples of whole tire reclaim there were added, respectively, 2½, 3, 4, and 5 c. c. of phosphoric acid on the mill. The reclaim was one which had been dispersed and then spray dried, and the phosphoric acid was of 85% concentration, sp. gr. 1.7. The degree of softening of the reclaim samples increased with the quantity of acid added; they sheeted out smoothly, and in each case the general appearance and behavior of the bank of stock on the mill was very similar to that of crude rubber. This acid treated reclaim was found to tube, calendar and mold in a manner greatly superior to the untreated reclaim. For the above described particular reclaim about 4 c. c. of acid to 600 grams of reclaim seemed to give about the best results, but it is obvious that the amount of acid to be used will depend upon the acid, the amount of alkali in the reclaim, and also upon the amount of softening desired for any particular purpose.

As stated above, many alkaline rubbers show an impaired tensile strength, even though the rate of vulcanization may sometimes be accelerated by the presence of the free alkali. The acid treatment herein described has the effect of appreciably increasing the tensile strength and improving the other physical properties as well. The improvement in plastic properties by the herein described acid treatment is independent of the presence of any of the usual compounding ingredients. In general, the addition, to rubbers of alkaline ash, of any of the acids and salts disclosed improves the handling properties of the rubber, such as ease of breakdown, calendering and extruding.

*I.*—As indicating the improvement in flexing ability of rubbers by use of the process when free acids are incorporated, the following examples are given, the first stock in each case being the blank:

*Example 1*

|  |  |  |
|---|---|---|
| Steam treated spray dried rubber | 100 | 100 |
| Spindle oil | 5 | 5 |
| Zinc oxide | 5 | 5 |
| Heptaldehyde-aniline accelerator | 0.2 | 0.2 |
| Sulphur | 4 | 4 |
| Phosphoric acid |  | .5 |

| CURE | Flexing in kilocycles | |
|---|---|---|
| 15'@45# | 7.8 | 13 |
| 30'@45# | 15.0 | 18.7 |
| 45'@45# | 17.3 | 23.1 |
| 60'@45# | 20.0 | 23.5 |
| 75'@45# | 17.1 | 28.0 |
| 105'@45# | 20.2 | 29.5 |

*Example 2*

|  |  |  |
|---|---|---|
| Spray dried rubber | 100 | 100 |
| Spindle oil | 5 | 5 |
| Zinc oxide | 5 | 5 |
| Heptaldehyde-aniline accelerator | 0.5 | 0.5 |
| Sulphur | 3.75 | 3.75 |
| Salicylic acid |  | 2 |

| CURE | Flexing in kilocycles | |
|---|---|---|
| 30'@45# | 9 | 12.2 |
| 45'@45# | 10.2 | 18.8 |
| 60'@45# | 7.8 | 14.8 |
| 75'@45# | 9.7 | 18.1 |
| 90'@45# | 7.5 | 21.4 |

*Example 3*

Monochloroacetic acid. Using a different fabric, and using a formula similar to that given for Example 2, but adding one part of monochloroacetic acid in place of salicylic, the following flexing results were obtained:

| Cure | Flexing in kilocycles | |
|---|---|---|
| 30'@45# | 25.9 | 70.1 |
| 45'@45# | 25.5 | 70.3 |
| 60'@45# | 17.6 | 57.2 |
| 75'@45# | 29.7 | 44.2 |
| 90'@45# | 20.3 | 45.0 |

*Example 4*

|  |  |  |
|---|---|---|
| Pale crepe | 50 | 50 |
| Smoked sheet | 50 | 50 |
| Whole tire reclaim (alkali process) | 75 |  |
| Whole tire reclaim (alkali process with 1% monochloracetic acid) |  | 75 |
| XX Zinc oxide | 5 | 5 |
| Spindle oil (mineral) | 8 | 8 |
| Heptaldehyde-aniline accelerator | 0.5 | 0.5 |
| Sulphur | 5.5 | 5.5 |

| CURE | Flexing in kilocycles | |
|---|---|---|
| 30'@45# | 17.5 | 10.5 |
| 45'@45# | 19.5 | 21.0 |
| 60'@45# | 20.1 | 26.6 |
| 75'@45# | 22.6 | 40.2 |
| 90'@45# | 18.7 | 39.8 |

The flexing data given in the above examples was obtained by the use of a test commonly applied in the tire industry, in which alternate plies of the rubber to be tested and of fabric are built up to the desired thickness, cut into pads which are usually 5" x 8", and the pads then vulcanized in a mold. After vulcanization the pads are removed from the mold and allowed to stand for about 36 hours, after which they are cut into strips, usually 8" x 1". The strips are then subjected to a flexing test in which each strip is secured in a machine by its ends while the intermediate portion of the strip is in contact with a weighted pulley. The strip is then pulled back and forth around the pulley at the rate of about 160 cycles per minute until separation of the plies begins, and the number of cycles required to cause separation of the rubber from the fabric is noted.

In the case of all the above examples, the fabric plies were made according to the process disclosed in Hopkinson Patent #1,424,020, in which the fabric is weftless and consists only of parallel cords impregnated with and united by rubber deposited directly from latex, and the latex used was compounded with spindle oil, formaldehyde-ethylamine condensation product accelerator, soap and sulphur.

While applicant does not desire to be bound by any theory, it is his belief that much of the softening effect and improvement in milling qualities of the rubber, and the improvement in the flexing quality of its vulcanizate, is due not only to direct neutralization of free alkali by the added material, but also to its decomposition of alkali salts of fatty acids and possibly of certain protein materials present, such as alkali proteinates. It is obvious that to obtain smooth milling and calendering on the mill, the rubber should desirably be in a continuous phase, but it is applicant's theory that the presence of the alkali metal soaps and other materials favors the formation of a dispersed rubber phase, as for example in the making of rubber dispersions, and hence the presence of such dispersed rubber phase is unfavorable to the ready formation of the continuous phase which is desirable for good softening and calendering properties on the mill. Therefore, it is applicant's belief that the fundamental principle of the process consists not only in the neutralization of free alkali but in the decomposition of the colloidal protective compounds of the alkalies with fatty acids and perhaps other materials, and the formation of non-protective and non-colloidal compounds. In other words, the free alkali is neutralized and the alkali soaps and proteinates are converted into compounds which are neutral or slightly acid, and which are not in themselves soap-like in character, that is, in the same sense as water soluble soaps. It is pointed out that crude rubber itself contains from 1 to 2% of naturally occurring soap forming fatty acids, and in the commercial formulas used by a large majority of manufacturers for tires and other articles there are also added fatty acids. As a result, when such rubbers are reclaimed, the fatty acids are present in the scrap and during the alkali reclaiming process alkali soaps are formed. Tests have shown that the addition of soap to rubbers reduces the flexing ability of the vulcanized stock, and tests have also shown that when the alkali soaps are washed out of reclaims by the use of alcohol, the reclaims are appreciably softer than those which have been washed with water only, as it is difficult to completely remove such soaps by the use of water.

In addition to the phosphoric, salicylic, and monochloracetic acids above mentioned, other acids such as citric, lactic, oxalic, acetic, di- and tri-chlor acetic, tartaric and betanaphthalene sulphonic acids may be used. Suitable acids generally are those which are of sufficient strength to decompose alkali proteinates and alkali soaps, and which are non-volatile at milling temperatures.

II.—As illustrating the improvement in flexing by the application of the process when using volatile base salts of non-volatile organic or inorganic acids strong enough to decompose alkali proteinates or alkali soaps, the following examples are given:

Example 5

|  |  |  |
|---|---|---|
| Spray dried rubber from ammonia latex | 100 | 100 |
| Zinc oxide | 5 | 5 |
| Spindle oil | 5 | 5 |
| Heptaldehyde-aniline accelerator | 0.5 | 0.5 |
| Sulphur | 3.75 | 3.75 |
| Ammonium chlor acetate |  | 2.0 |

| CURE | Flexing in kilocycles | |
|---|---|---|
| 30′ @ 45# | 18.8 | 20.1 |
| 45′ @ 45# | 19.1 | 22.4 |
| 60′ @ 45# | 16.4 | 26.2 |
| 75′ @ 45# | 10.4 | 20.2 |
| 90′ @ 45# | 14.9 | 17.5 |

Example 6

Ammonium lactate. Using the same formula as given in Example 5, but substituting 1½ parts of ammonium lactate for the ammonium chloracetate, the following flexing results were obtained.

| CURE | Flexing in kilocycles | |
|---|---|---|
| 30′ @ 45# | 18.8 | 18.5 |
| 45′ @ 45# | 19.1 | 18.4 |
| 60′ @ 45# | 16.4 | 17.6 |
| 75′ @ 45# | 10.4 | 20.4 |
| 90′ @ 45# | 14.9 | 19.3 |

III.—The process of the invention may also be carried out by adding to rubber heavy metal water soluble salts of acids, organic or inorganic, volatile or non-volatile, which are strong enough to decompose alkali proteinates or alkali soaps. As before, these salts may be added either as such or in solution. As examples showing the improvement in flexing ability of rubbers treated according to this modification of the invention, the following are given:

Example 7

|  |  |  |
|---|---|---|
| Pale crepe | 50 | 50 |
| Smoked sheet | 50 | 50 |
| Reclaim (alkaline) | 75 | 75 |
| Spindle oil | 5 | 5 |
| Zinc oxide | 5 | 5 |
| Heptaldehyde-aniline accelerator | 0.5 | 0.5 |
| Zinc nitrate |  | 2 |

| CURE | Flexing in kilocycles | |
|---|---|---|
| 30′ @ 45# | 12.8 | 22.0 |
| 45′ @ 45# | 10.5 | 27.9 |
| 60′ @ 45# | 10.8 | 15.4 |
| 75′ @ 45# | 13.5 | 9.7 |

Example 8

|  |  |  |
|---|---|---|
| Pale crepe | 50 | 50 |
| Smoked sheet | 50 | 50 |
| Whole tire reclaim (alkali process) | 75 |  |
| Whole tire reclaim (alkali process with 2% zinc chloride) |  | 75 |
| Spindle oil | 8 | 8 |
| Zinc oxide | 5 | 5 |
| Heptaldehyde-aniline accelerator | 0.5 | 0.7 |
| Sulphur | 3.75 | 3.75 |

| CURE | Flexing in kilocycles | |
|---|---|---|
| 30′ @ 45# | 11.4 |  |
| 45′ @ 45# | 10.8 | 37.2 |
| 60′ @ 45# | 16.6 | 38.0 |
| 75′ @ 45# | 11.7 | 66.5 |
| 90′ @ 45# | 12.2 | 58.2 |

Example 9

| Spray dried rubber [1] | 100 | 100 |
|---|---|---|
| Spindle oil | 5 | 5 |
| Zinc oxide | 5 | 5 |
| Heptaldehyde-aniline accelerator | 0.5 | 0.5 |
| Zinc chloride | | 1.6 |

| CURE | Flexing in kilocycles | |
|---|---|---|
| 30' @ 45# | 13.8 | 50.5 |
| 45' @ 45# | 12.8 | 63.9 |
| 60' @ 45# | 15.5 | 86.1 |
| 75' @ 45# | 12.9 | 72.1 |
| 90' @ 45# | 11.7 | 94.3 |

[1] From latex containing formaldehyde and a sulphonated fatty acid.

Example 10

| Spray dried rubber [1] | 100 | 100 |
|---|---|---|
| Whole tire reclaim (alkali process) | 75 | |
| Whole tire reclaim (alkali process with 4.7% zinc chloride) | | 75 |
| Spindle oil | 8 | 8 |
| Zinc oxide | 5 | 5 |
| Heptaldehyde-aniline accelerator | 0.5 | 0.75 |
| Sulphur | 5.5 | 5.5 |

| CURE | Flexing in kilocycles | |
|---|---|---|
| 30' @ 45# | 8.0 | 27.6 |
| 45' @ 45# | 6.3 | 33.0 |
| 60' @ 45# | 6.4 | 56.7 |
| 75' @ 45# | 5.3 | 66.7 |
| 90' @ 45# | 5.1 | 52.6 |

[1] From latex containing formaldehyde and a sulphonated fatty acid.

Example 11

| Spray dried rubber [1] | 100 | 100 |
|---|---|---|
| Reclaim (alkaline) | 75 | 75 |
| Spindle oil | 5 | 5 |
| Zinc oxide | 5 | 5 |
| Heptaldehyde-aniline accelerator | 0.5 | 0.5 |
| Zinc chloride | | 2.5 |

| CURE | Flexing in kilocycles | |
|---|---|---|
| 30' @ 45# | 8.8 | 19.5 |
| 45' @ 45# | 6.5 | 24.2 |
| 60' @ 45# | 5.2 | 23.8 |
| 75' @ 45# | 4.5 | 20.3 |
| 90' @ 45# | 4.4 | 24.4 |

[1] From latex containing formaldehyde and a sulphonated fatty acid.

The modification of the invention disclosed in the last five examples is specifically claimed in co-pending application Serial No. 434,463, filed March 8, 1930.

The increase in flexing capacity of articles made according to the present invention is most pronounced where the rubbers treated are definitely alkaline, such as those to which fixed alkali has been added, and alkali processed reclaims, i. e. vulcanized rubbers which have been restored to a plastic condition to render them suitable for re-use in rubber manufacturing operations; but there is also an improvement in the case of all rubbers showing an alkaline ash, such as all-solids-content-latex rubbers, or with various combinations of any of the above rubbers.

The precise amounts of the free acid or salt to be added will necessarily vary with the character of the mix and the particular acid or salt, and in general, the more alkaline the rubber mix, the greater the amount of any given acid or salt will be required, and this amount can be readily determined by experiment. In case the rate of vulcanization of a compound is slowed down to any material extent by the addition of the acids or salts this can be overcome by increasing the amount of accelerator.

It will be seen that by the use of the invention the flexing capacity of rubber and rubber and fabric articles may be very greatly increased, and as a result either articles of marked superiority in this respect are obtained with the usual stocks, or much cheaper rubber stocks may be used and yet produce flexing capacity equal to or greater than that of much more expensive stocks at present in use. The invention is capable of wide use in the manufacture of all rubber articles where good flexing is desirable, and it is of particular value for use with the usual vulcanized articles of commerce which are built up of layers of fabric and rubber, such as tires, belting, hose, etc. The improvement in milling properties is another valuable feature of the invention, as the softening of the rubber increases the speed of operation; and the uniformity of, and increase in, plasticity is of great importance in extrusion operations and calendering operations, in which latter it is in many cases necessary to calender in thicknesses of a few thousandths of an inch.

Where the term "rubber" is used in the claims without qualification, it is intended to cover reclaim.

Having thus described my invention, what I claim and desire to protect by Letters Patent is:

1. A method of improving the physical properties of rubber before and after vulcanization, which comprises plasticizing a body of solid rubber by adding at the beginning of its breakdown a water soluble material hydrolizable to produce acid ions capable of decomposing alkali proteinates and alkali soaps, sufficient of said material being added to reduce the pH of the water extract of the rubber at least to neutrality.

2. A method of improving the physical properties of rubber before and after vulcanization, which comprises incorporating in a body of spray dried rubber derived from ammonia latex, during breakdown, a water soluble material hydrolizable to produce acid ions capable of decomposing alkali proteinates and alkali soaps, sufficient of said material being added to reduce the pH of the water extract of the rubber at least to neutrality, mechanically working the rubber to a smooth, plastic condition, incorporating it in a rubber and fibre article, and vulcanizing.

3. A method of improving the physical properties of rubber before and after vulcanization, which comprises incorporating in reclaimed and raw rubber giving an alkaline ash, during breakdown, a water soluble material hydrolizable to produce fixed-acid ions capable of decomposing alkali proteinates and alkali soaps, sufficient of said material being added to reduce the pH of the water extract of the rubber to not more than approximately 7, reducing the rubber to a smooth, plastic condition by mechanical working, and forming and vulcanizing a rubber and fibre article from the mixture.

4. A method of improving the physical properties of rubber before and after vulcanization which comprises plasticizing a body of solid rubber by adding during milling a non-volatile acid strong enough to decompose alkali proteinates and soaps, in quantity sufficient to reduce the pH of the water extract of the rubber to at least approximately neutrality, and reducing the rubber to a smooth plastic condition by mechanical working.

5. A method of improving the physical properties of rubber before and after vulcanization, which comprises incorporating in a body of spray dried rubber derived from ammonia latex, during breakdown, a non-volatile acid strong enough to decompose alkali proteinates and soaps, and in an amount sufficient to reduce the pH of the water extract of the rubber at least to neutrality, reducing the rubber to a smooth, plastic condition by mechanical working, and forming and vulcanizing a rubber and fibre article from the mixture.

6. A method of improving the physical properties of rubber before and after vulcanization which comprises incorporating in reclaimed and raw rubber giving an alkaline ash, during breakdown a water soluble non-volatile acid strong enough to decompose alkali proteinates and soaps, and in an amount sufficient to reduce the pH of the water extract of the rubber below 7, reducing the rubber to a smooth, plastic condition by mechanical working, and forming and vulcanizing a rubber and fabric article from the mixture.

7. A method of improving the physical properties of rubber before and after vulcanization which comprises incorporating in a body of solid rubber before vulcanization and at the beginning of its breakdown a plasticizing agent comprising a strong organic acid selected from the group consisting of salicylic, mono-, di-, and tri-chlor acetic, oxalic, citric, lactic, tartaric, and beta napthalene sulphonic acids, in an amount sufficient to reduce the pH of the water extract of the rubber at least to neutrality, reducing the rubber to a smooth, plastic condition by mechanical working, and forming and vulcanizing a rubber and fibre article from the mixture.

8. The plastic product of an alkaline-ash solid rubber plasticized at the beginning of its breakdown by the addition of a fixed water soluble acid strong enough to decompose alkali proteinates and alkali soaps, the pH of the water extract of said product not exceeding approximately 7.

9. The plastic product of the mixture of raw rubber and alkaline reclaim, plasticized in the presence of a fixed water soluble acid strong enough to decompose alkali proteinates and alkali soaps, the pH of the water extract of said product not exceeding approximately 7.

WILLIS A. GIBBONS.